(12) United States Patent
Bogdan

(10) Patent No.: US 6,464,922 B1
(45) Date of Patent: Oct. 15, 2002

(54) INSERTION DEVICE FOR PLASTIC MOLDING

(75) Inventor: Corneliu A. Bogdan, Monroe, MI (US)

(73) Assignee: Autotec, Inc., Sylvania, OH (US)

( * ) Notice: Subject to any disclaimer, the term of this patent is extended or adjusted under 35 U.S.C. 154(b) by 0 days.

(21) Appl. No.: 09/459,220

(22) Filed: Dec. 10, 1999

(51) Int. Cl.⁷ .......................... B29C 45/14; B29C 33/16
(52) U.S. Cl. ............... 264/277; 425/121; 425/DIG. 33; 264/275; 264/278
(58) Field of Search .............................. 264/275, 277, 264/278, 271.1, 509, 510; 425/DIG. 33, 121, 123

(56) References Cited

U.S. PATENT DOCUMENTS

| | | | |
|---|---|---|---|
| 3,861,955 A | * | 1/1975 | Lemelson .................... 117/235 |
| 3,947,208 A | * | 3/1976 | Broderick ............... 425/436 R |
| 4,144,010 A | | 3/1979 | Fenner |
| 4,368,018 A | | 1/1983 | Rees et al. |
| 4,524,516 A | | 6/1985 | Wiechard |
| 4,990,299 A | * | 2/1991 | Sorensen ................. 264/297.4 |
| 5,234,328 A | * | 8/1993 | Willson et al. ............. 425/139 |
| 5,340,425 A | | 8/1994 | Strapazzini |
| 5,411,688 A | | 5/1995 | Morrison et al. |
| 5,736,168 A | | 4/1998 | Goyal et al. |
| 5,788,905 A | | 8/1998 | Miller et al. |
| 5,824,251 A | | 10/1998 | Morrison et al. |
| 5,839,584 A | | 11/1998 | Gonsalves et al. |
| 5,845,458 A | | 12/1998 | Patel |
| 6,086,808 A | * | 7/2000 | Sorensen et al. ........... 264/250 |

* cited by examiner

Primary Examiner—Angela Ortiz (57) ABSTRACT

A method and apparatus for inserting elements to be adhered to a plastic article being blow molded includes an insertion device having an insert arm for carrying a carpet intended to be affixed to one mold section and a second inserter for inserting nuts intended to be supported in the opposing mold section for molding on the opposite side of the article. The carpet inserted utilizes an arm having a pair of pins which extend through elongated slots formed in the carpet. The mold is provided with pins to receive the carpet from the inserter pin after the carpet is stripped from the inserter pins. The nut inserter utilizes a nest having a small magnet. The mold section is provided with pins and a stronger magnet behind such pins. Upon movement of the nest with the nuts thereon to the mold section, the arm is properly aligned and moved to position the nuts over a pin extending from the molding surface of the mold section. A stronger magnet behind the pin causes the nuts to be retained thereon following removal of the nest assemblies from engagement with the mold surface.

16 Claims, 14 Drawing Sheets

INSERTION DEVICE FOR PLASTIC MOLDING

The present application relates to an insertion device for use with a plastic molding machine which inserts elements intended to be affixed to a plastic article being molded in a partible mold. It is specifically tailored for use with a blow mold and permits the affixing of a carpet or similar fabric to one side of the plastic article being blow molded and/or the affixing of mounting screws on the other side of the article being blow molded, all in precisely located positions, with the newly molded plastic effecting the bonding between the elements inserted and the blown article without use of adhesive.

The carpet or other fabric is carried on a pair of pins of a transfer arm from a position outside of the molding machine to a position between the open sections of a blow mold in which the final article is to be blown. The pins extend through vertical slits or elongated openings in the carpet. One of the mold halves has a pair of pins positioned to receive the carpet from the transfer arm pins. When the transfer arm is between the mold sections, the mold pins are positioned below and aligned vertically with the pins of the transfer arm. Upon movement of the transfer arm pins carrying the carpet toward the mold pins, the respective pins become overlapped so that the carpet is retained on the transfer arm pins while the mold pins, vertically aligned therewith and positioned therebelow, are caused to extend through the slits/openings of the carpet. The carpet is then pushed off of the transfer arm pins and permitted to drop a short distance to become supported on the mold pins.

The mold section opposing the mold section receiving the carpet is intended to receive threaded nuts to be molded in place on the side of the molded article opposite the carpet. The nuts are supported in a nest of a transfer arm. Each nest has a small magnet to assist in retaining the nuts in their respective nests. The mold section intended to receive the nuts has an outwardly extending pin to receive each nut. A significantly stronger magnet adjacent the pin near the mold face draws the nuts away from the smaller magnets adjacent the nests of the transfer arm. The transfer arm has a bushing positioned to receive an alignment pin extending outwardly from the mold section to ensure proper positioning as the arm carrying the nuts is moved toward the mold section.

DETAILED DESCRIPTION OF THE INVENTION

Figure 17:
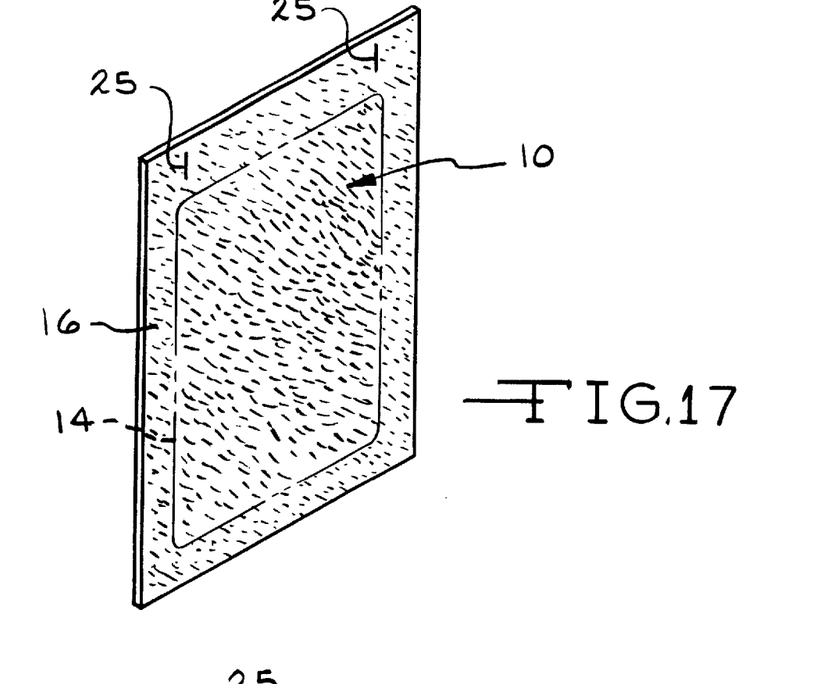
FIG. 17 is a perspective view of the newly molded part showing the carpet side thereof prior to trimming.
Figure 18:
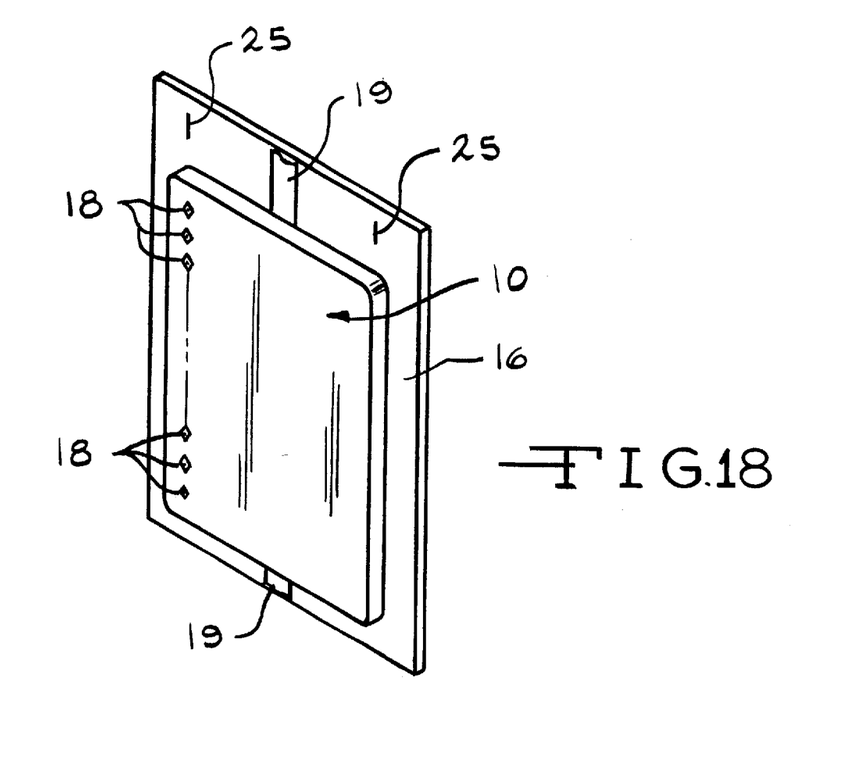
FIG. 18 is a view similar to FIG. 17 taken from the opposing side showing the nuts in combination with the molded part.

Referring initially to FIGS. 17 and 18, there is shown a blow molded interior panel 10 for an automobile interior. FIG. 17 shows the panel 10 with a molded-in-place carpet 12 affixed to one surface thereof. A trim line 14 is shown in dashed lines with a finished panel 10 being represented by that portion within the dashed lines and the portion outside the trim line 14 representing waste 16 to be trimmed therefrom. FIG. 18 shows the panel 10 from the opposite side with nuts 18 molded-in-place to provide means for supporting the panel 10 in the automobile. Waste 16 is shown at the outer peripheral regions beyond the panel 10. Centrally positioned in each of the areas of waste 16 above and below the molded panel 10 is the remaining portion 19 of a plastic tubular parison from which the panel 10 was blown. The carpet 12 has a pair of vertical slits 25 formed therein.

Figure 1:
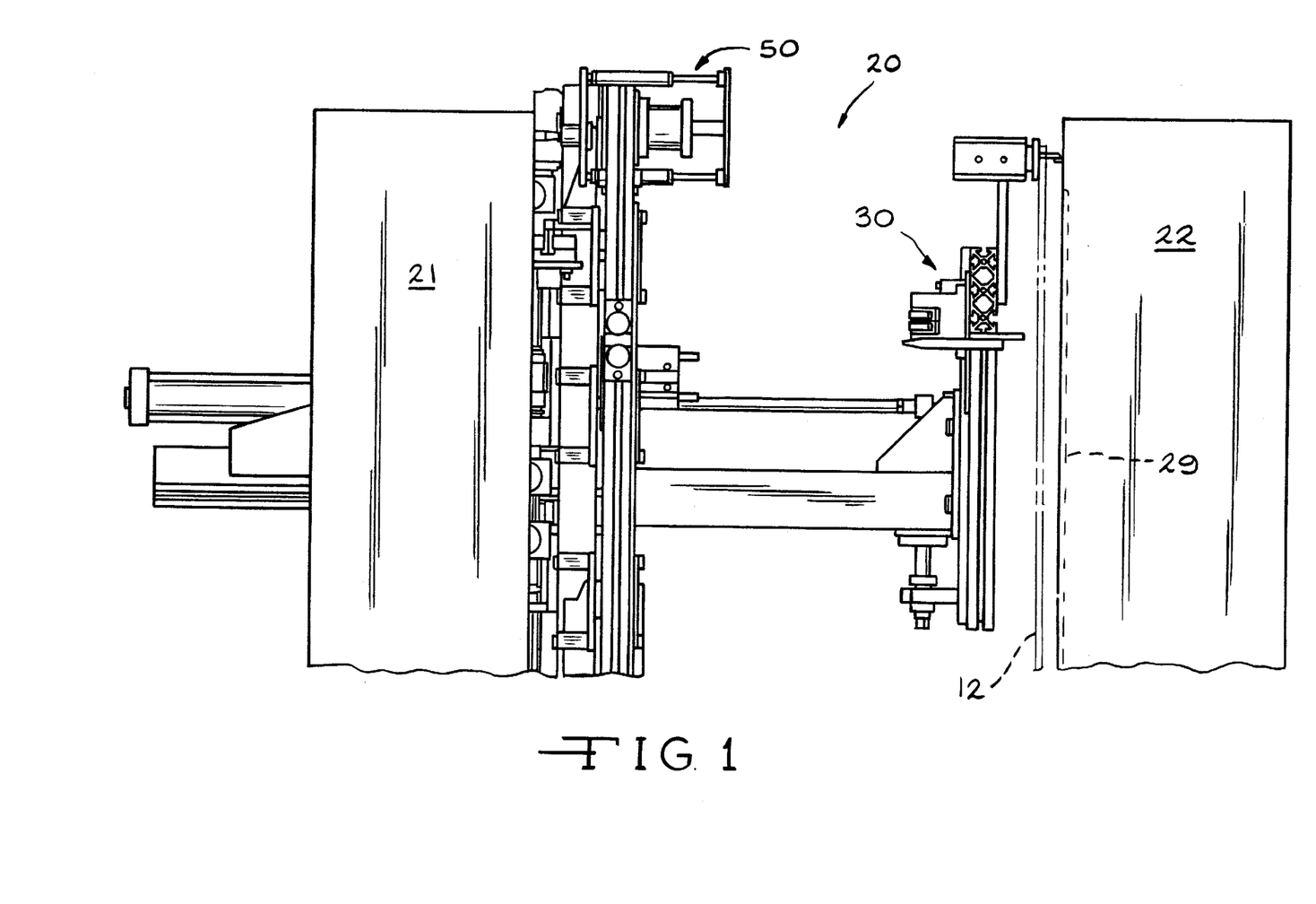
FIG. 1 is an elevational view showing the transfer mechanisms for the transfer of the carpet to a movable mold section and the transfer for the nuts to an opposing, fixed mold section.
Figure 2:
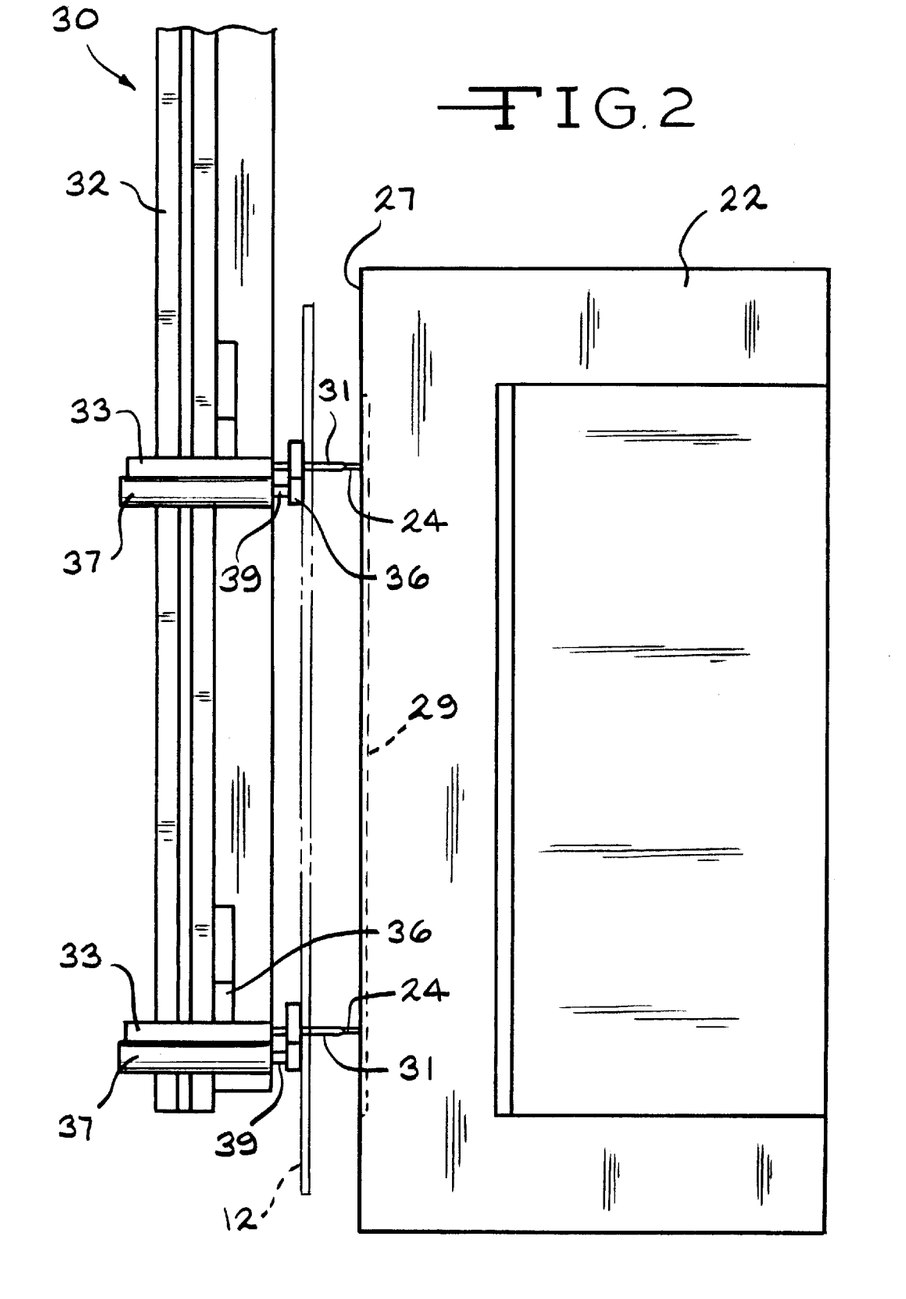
FIG. 2 is a top plan view of the carpet inserter supporting the carpet in a position ready to strip it onto pins of a movable mold section.

Referring to FIG. 1, there is shown an elevational view of the insertion device generally indicated by the numeral 20 positioned between the open halves or sections of a blow mold, such blow mold includes a stationary or fixed mold section 21 and a moveable mold section 22. If desired, both mold sections could be moveable. The mold sections 21 and 22, when closed, define a molding cavity in which the panel 10 may be blow molded. Each of the mold sections 21, 22 has a flat or planar mating face 26 and 27, respectively, with recesses 28 and 29 there within cooperating to define the molding cavity when the mold sections 21, 22 are closed. The nuts 18 will be positioned in the stationary mold section 21 and the carpet 12 will be positioned in the moveable mold section 22.

Referring to FIGS. 2 and 6 through 9, there is shown a carpet inserter 30 portion of the insertion device 20 which positions the carpet 12 in the moveable mold section 22. The moveable mold section 22 is provided with a pair of retention pins 24 extending outwardly from its mating face 27 facing the opposing mold section 21. The pins 24 are located in an area above the molding recess 29 and do not interfere with the molding of the plastic material therein.

The carpet inserter 30 includes a moveable insertion bar 32 on which are mounted a pair of pins 31. The pins 31 extend from a pin support 33 secured to the moveable insertion bar 32 by a bracket 34. (See FIGS. 6–9). Each pin 31 extends through a stripper plate 36 mounted on the end of a piston rod which is moveable by a pneumatic cylinder 37 (FIG. 2) which is mounted on the insertion bar 32. Each stripper plate 36 is provided with an elongated slot 38 through which each respective pin 31 extends. The pins 31 are spaced apart the same distance as the pins 24 of the mold section 22. The vertical slits 25 extend completely through the thickness of the carpet 12 and each have a length sufficient to have both the pin 31 of the carpet inserter 30 and the pin 24 of the mold section 22 positioned therein at the same time.

Movement of the insertion bar 32 carrying the pins 31 between the mold sections 21 and 22 is precisely controlled so that, when inserted, the pins 31 become vertically aligned with the pins 24 in a position above the pins 24. The carpet inserter 30 will be positioned sufficiently close to the mating face 27 of the moveable mold section 22 that its pins 31 overlap the retention pins 24 extending outwardly from the mating face 27. However, the ends of the such transfer pins 31 will be spaced sufficiently far from the mating face 27 to permit transfer of the carpet 12 from the pins 31 to the pins 24. The actual transfer is effected by means of the cylinder 37 extending its piston rod 39 with the stripper plate 36 mounted thereon to push the stripper plate 36 and the carpet 12 beyond the end of pin 31 at which position the carpet 12 will be drop downwardly by the force of gravity into a position at which the ends of the slits 25 will then rest upon the pins 24 of mold section 22. (See FIG. 8). The cylinder 37 will then retract the piston rod 39 and stripper plate 36 (See FIG. 9) and the carpet inserter will then be in a position to be removed from between the mold sections 21, 22 to receive a new carpet 12.

Figure 3:
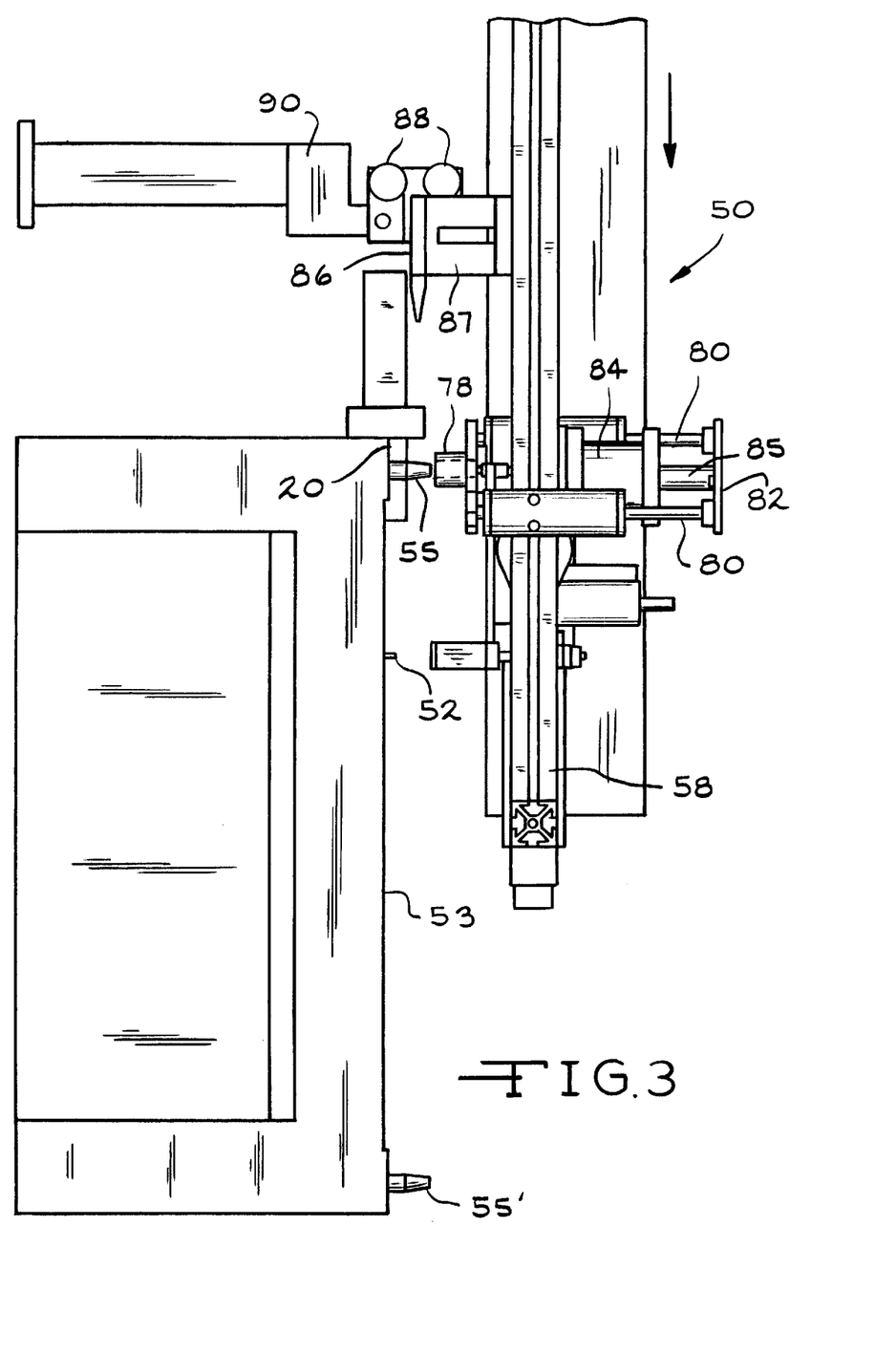
FIG. 3 is a top plan view showing the nut inserter positioned adjacent fixed mold section which is to receive the nuts.
Figure 4:
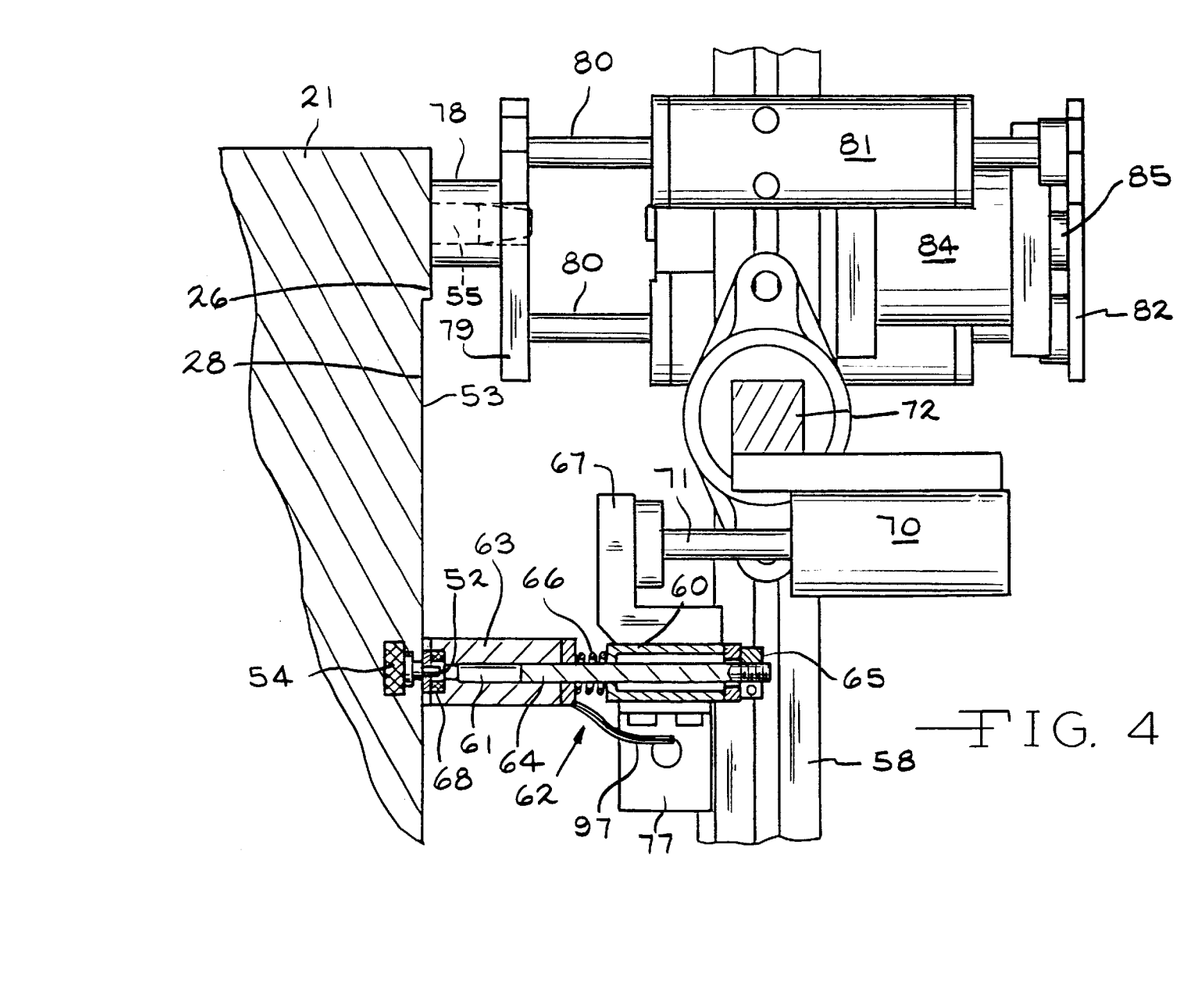
FIG. 4 is an enlarged fragmentary view of a portion of FIG. 3 showing the nuts being transferred from the transfer arm to the mold section.
Figure 5:
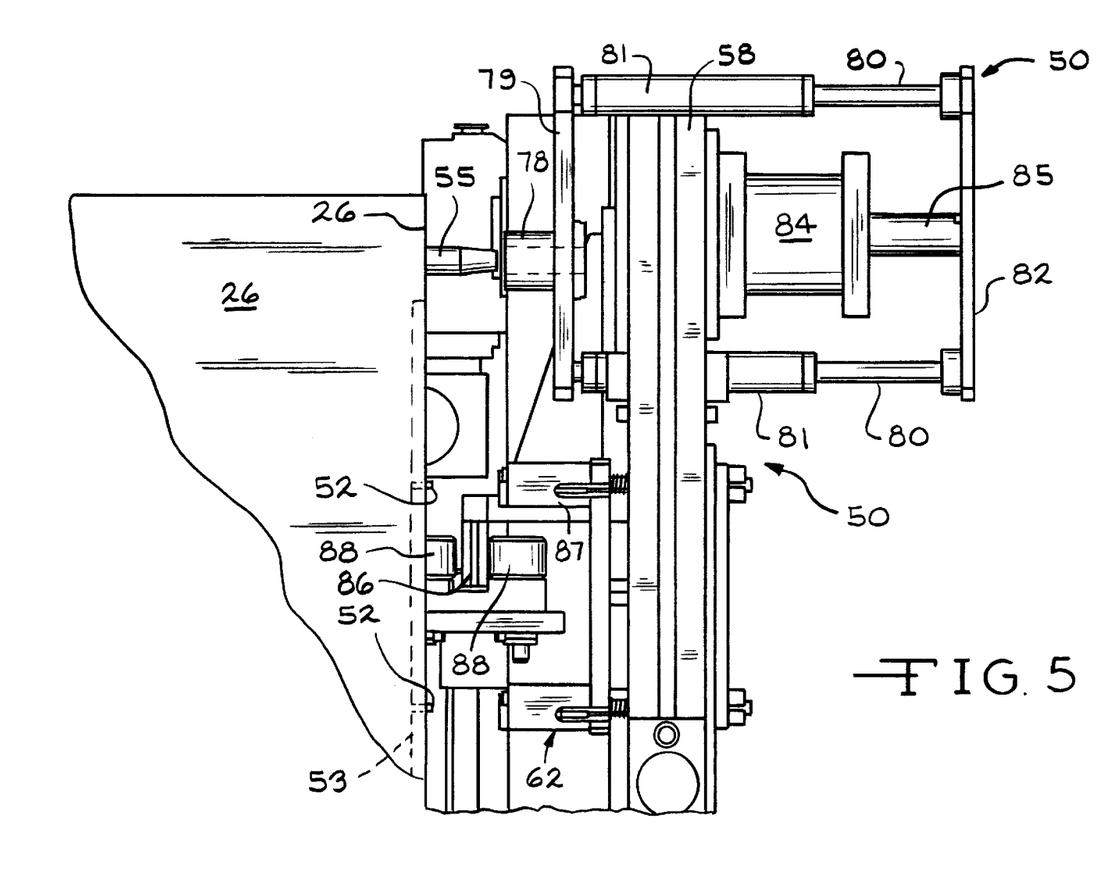
FIG. 5 is an enlarged fragmentary elevational view showing the nut inserter positioned adjacent the fixed mold section.
Figure 6:
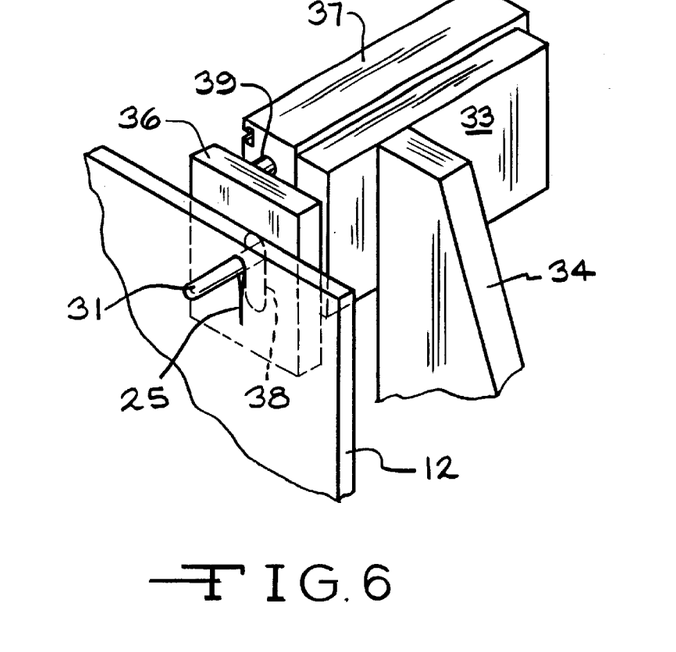
FIG. 6 is a fragmentary perspective view showing a portion of the carpet being supported on the carpet inserter.

Referring now to FIGS. 1, 3 through 5, 10 and 11, there is shown a nut inserter 50 for positioning nuts 18 in the stationary mold section 21. As can be seen in FIGS. 3, 4 and 5, the stationary mold section 21 is provided with a series of vertically aligned pins 52 (See FIGS. 3 and 5) extending outwardly from the surface 53 of the mold recess 28. Each of the pins 52 is intended to receive a nut 18. A series of strong magnets 54 (See FIG. 4), for example 20 pounds, are mounted in the stationary mold section 21 adjacent each pin 52. Each magnet cooperates with its respective pin 52 to support, following transfer, each respective nut 18 against the surface 53 of the stationary mold section 21 in a position to have plastic molded therearound. The stationary mold section 21 also has an alignment pin 55 extending outwardly from its mating face 26 toward the moveable mold section 22. As can be seen in FIG. 3, the stationary mold section 21 also has a second alignment pin 55'. Each of the alignment pins 55 and 55' fits into a recess (not shown) of the moveable mold section 22 upon closing of the moveable mold section 22 against the stationary mold section 21. The use of such alignment pins 55, 55' for properly aligning mold sections as they close is well known in the art and will not be further described. However, in the present invention, the alignment pin 55 has an additional use in properly aligning the nut inserter 50 to ensure proper alignment of the nuts 18 with their respective pins 52.

The nut inserter 50 includes a main support arm 58 which is moveable from a position outwardly of the spaced apart mold sections 21 and 22 to a position between such mold sections, as shown in FIGS. 3 through 5, for transferring the nuts 18 to the pins 22.

Figure 10:
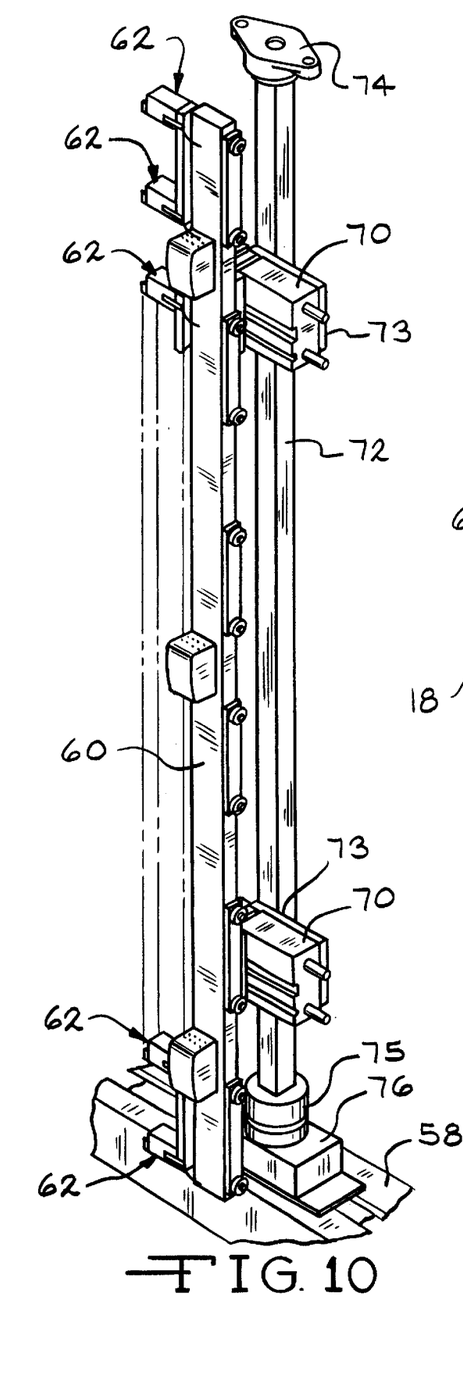
FIG. 10 is a perspective view showing a portion of the nut inserter.

Referring to FIG. 10, a vertically extending bracket 60 supports a plurality of nest assemblies 62, each of which is designed to support a nut 18. (See FIG. 11). The number of nest assemblies 62 will depend upon the number of nuts 18 intended for the molded article 10. As may be seen in FIGS. 4 and 11, each nest assembly 62 includes a housing 63 having a central passageway 61 fixedly mounted on a rod 64.

Figure 11:
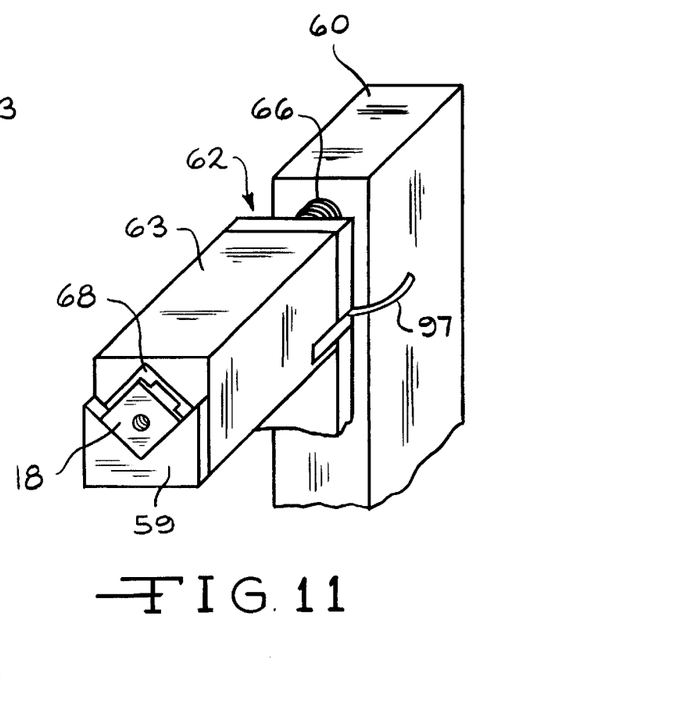
FIG. 11 is a perspective view showing one of the nest assemblies for supporting the nuts on the nut inserter.

Each housing 63 is supported on the vertical bracket 60 by the rod 64 which extends through and is moveable relative to vertical bracket 60. A compression spring 66 is positioned between the vertical bracket 60 and the housing 63. A clamp collar 65 threadedly secured to the rod 64 prevents the spring 66 from pushing the housing 63 and rod 64 off of the vertical bracket 60.

A light magnet 68 having significantly lower magnetic force, for example four pounds, than the magnet 54 is positioned in the end of the housing 63 and serves to retain the nut 18 in the nest assembly 62. A corner nest 59 fixes the position of each nut 18. A fiber optic cable 97 mounted on the housing 63 operating in conjunction with a photo sensor detects presence of a nut 18.

With reference to FIG. 10, the vertical bracket 60 is supported on brackets 67 mounted on a pair of cylinder guide blocks 70 each of which is affixed to a rotatable square rod 72 by a support plate 73. The square rod 72 extends between an upper fixed bearing 74 and a rotatable block 75 driven by a rotable actuator 76 supported on the support arm 58. Rotation of the square rod 72 by the motor 75 assists in loading the nuts 18 into the respective nest assemblies 62 by rotating the nest assemblies 62 from a position facing the mold surface 53 to a clockwise position 90° therefrom following withdrawal of the nut inserter 50 from a position between the mold sections 21 and 22 after discharge and placement of the previously supported group of nuts 18.

In order to assure proper alignment of the nest assemblies 62 and the nuts 18 with the pins 52 intended to receive the nuts 18, the nut inserter 50 is provided with a bushing 78 intended to receive the alignment pin 55 extending from the mold section 21. The bushing 78 is supported on a support plate 79 mounted on a pair of guide rods 80. Each guide rod 80 extends through a support 81 affixed to the support arm 58. A plate 82 is mounted on the opposing ends of each of the guide rods 80. Movement of the bushing 78 toward the alignment pin 55 is powered by a pneumatic cylinder 84 having a piston rod 85 affixed to the plate 82. Retraction of the cylinder rod 85 into its pneumatic cylinder from the position shown in FIG. 5 to the position shown in FIG. 4, carries the guide rods 80 and the bushing 78 carried thereby into engagement with the alignment pin 55 to ensure proper alignment prior to movement of the nest assemblies 62 toward the pins 52.

As the nut inserter 50 moves laterally from a position outside of the spaced apart mold sections 21, 22 to a position between such mold sections 21, 22 as shown in FIG. 3, there is a tendency for the support arm 58 and the members supported thereby to wobble or drift slightly. In order to maintain alignment of the support arm 58 substantially parallel to the open faces of the mold sections 21, 22, the support arm 58 has mounted thereon a guide wedge 86 supported on a bracket 87 mounted on the support arm 58. A pair of cam rollers 88 are mounted in a fixed position on a support member 90. As the arm 58 moves from an outer remote position relative to the mold sections 21, 22 in the direction indicated by the arrow in FIG. 3 to a position between the open mold sections 21, 22, the alignment wedge 86 passes between the cam rollers 88 to guide and steady the support arm 58 in a parallel relationship with the faces of the mold sections 21, 22.

Following actuation of the pneumatic cylinder 84 to engage the bushing 78 to the alignment pin 55 thereby assuring proper alignment of each of the nuts 18 carried by the nut inserter 50 with its respective pin 52 extending from the surface 53 of mold section 21, the pneumatic cylinders carried by the upper and lower cylinder blocks 70 (See FIGS. 4 and 10) are actuated to extend there respective piston rods 71 to thereby move the brackets 67 and vertical bracket 60 to carry the nest assemblies 62 into engagement with the surface 53. Such engagement will telescope each of the nuts 18 over its respective pin 52 of mold section 21. Because of the fact that the magnet 54 in the mold section 21 is significantly stronger than the magnet 68 of the nest assembly 62, the nuts 18 will be retained on the pins 52 upon withdrawal of the nest assemblies 62 from the surface 53 of the mold section 21.

It should be noted that there will be a slight additional movement of the piston rod bracket 67 and vertical bracket 60 following the engagement of the nut 18 to the surface 53. Such additional movement is permitted by compression of the spring 66 which encircles the rod 64 and is positioned between the vertical bracket 60 and housing 63.

Figure 7:
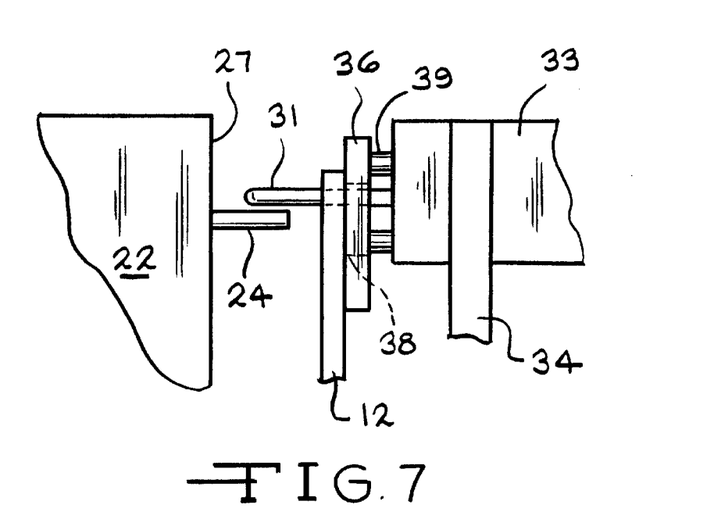
FIG. 7 is a fragmentary elevational view showing the carpet about to be transferred from the carpet inserter pins to the mold pins.
Figure 8:
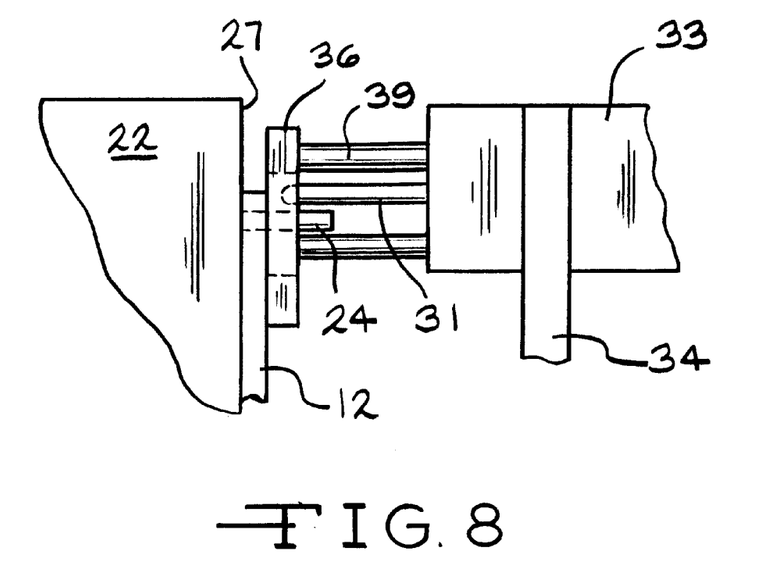
FIG. 8 is a view similar to FIG. 7 showing the carpet being transferred to the mold pins.
Figure 9:
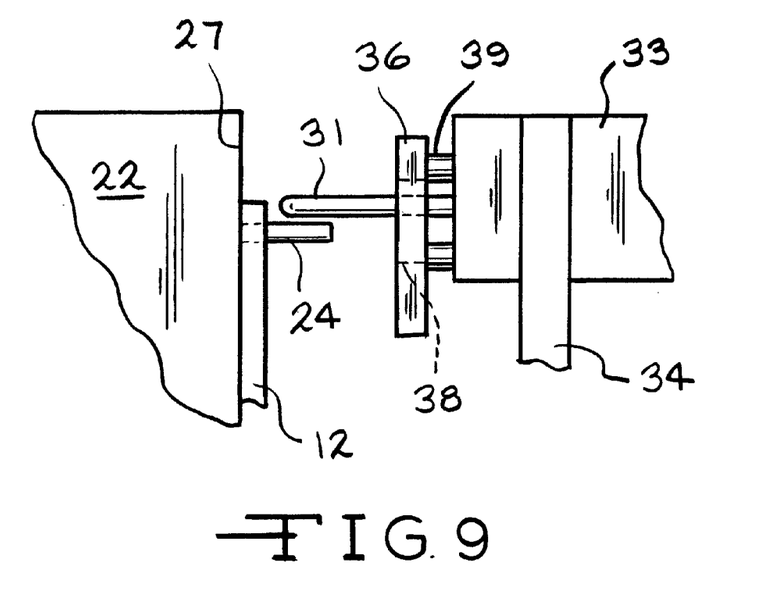
FIG. 9 is a view similar to FIG. 7 showing the position of the parts following transfer of the carpet to the mold pins.
Figure 12:
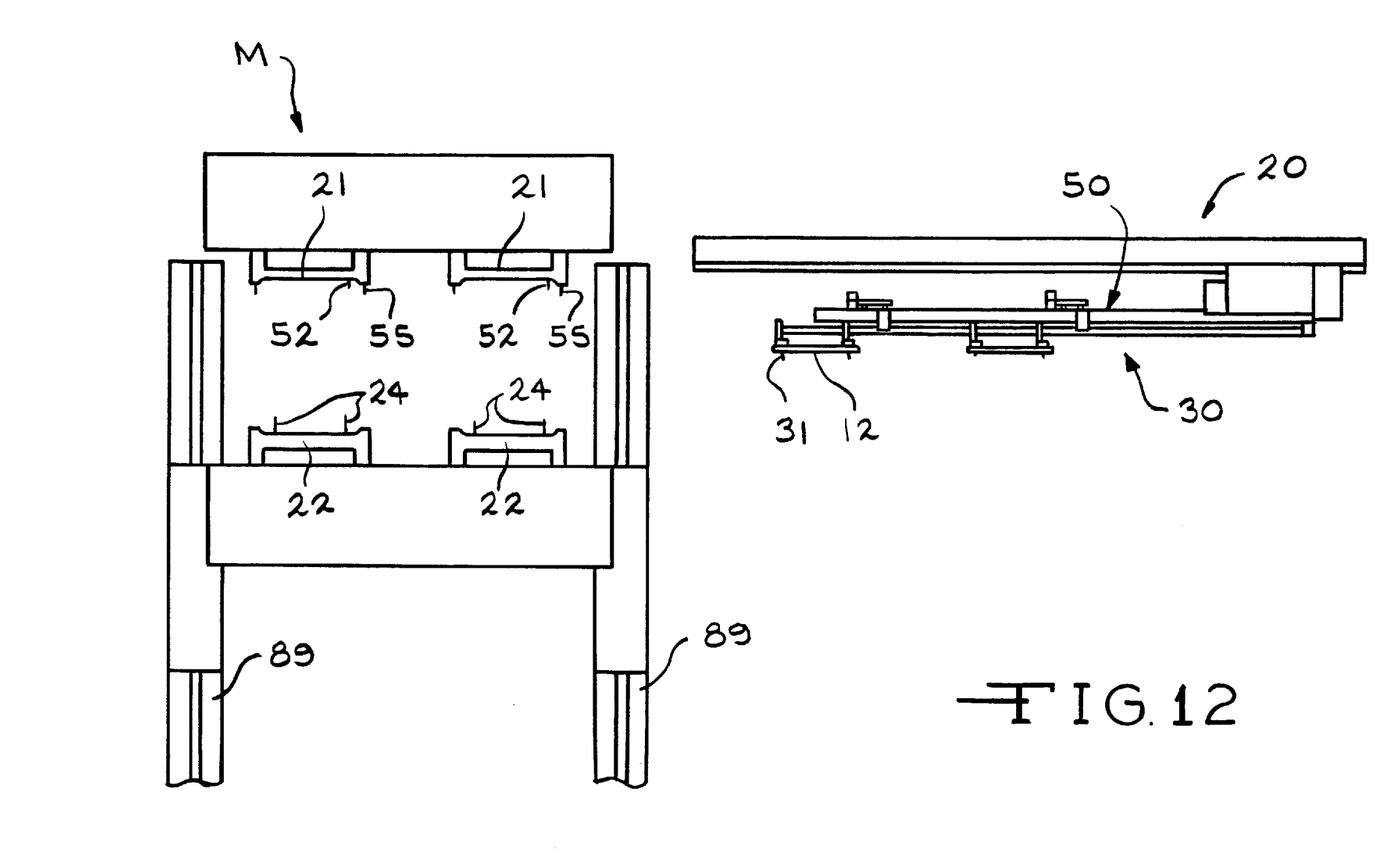
FIGS. 12 through 16 are top schematic views showing the relative positioning of the mechanisms for positioning the carpet and the nuts on their respective mold sections and for molding the final parts.
Figure 13:
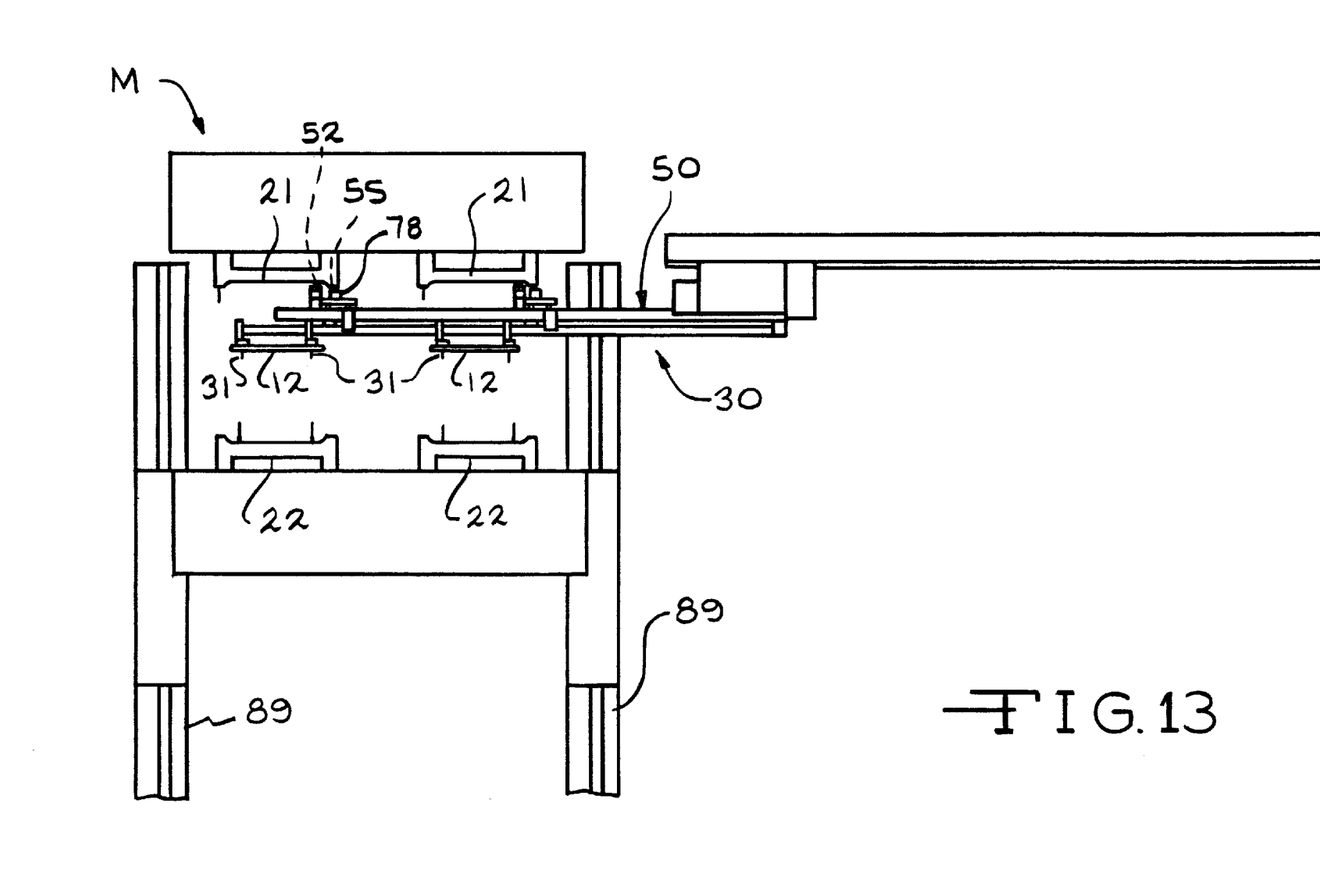
Figure 14:
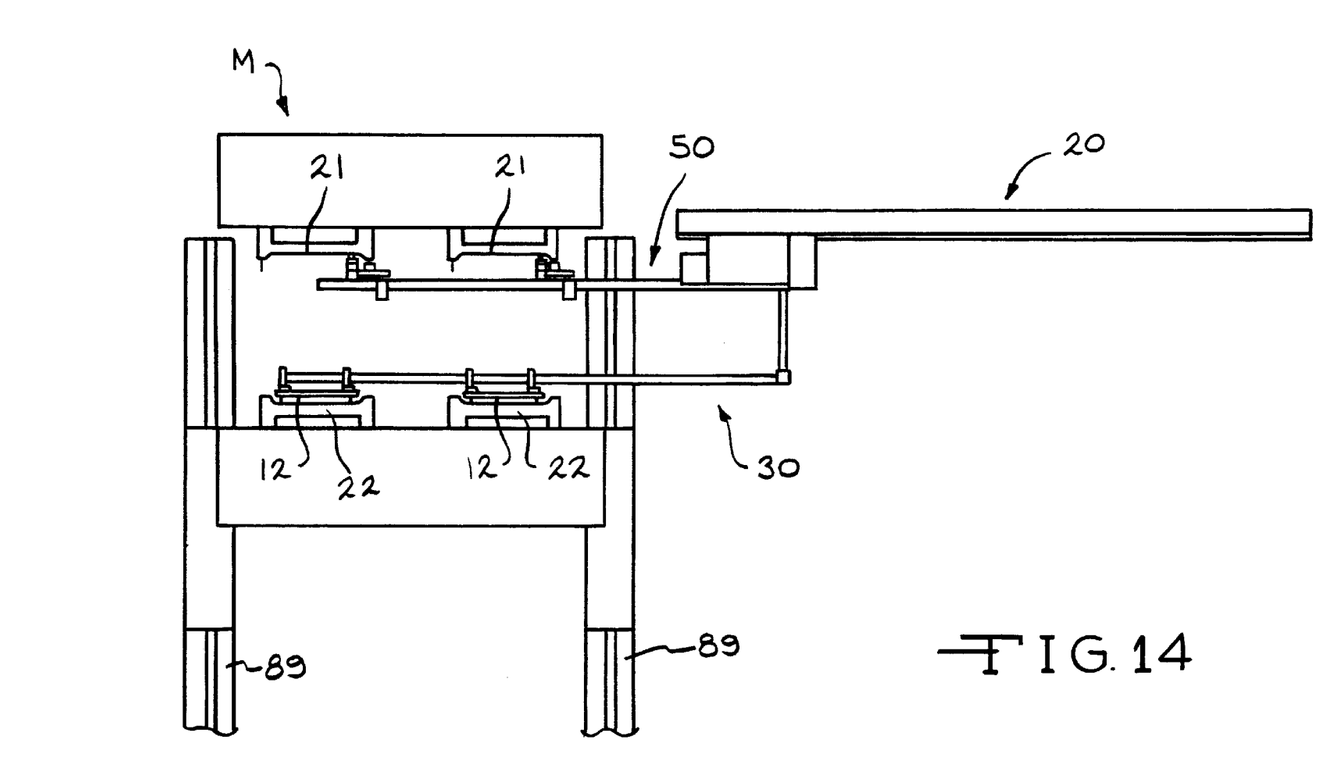
Figure 15:
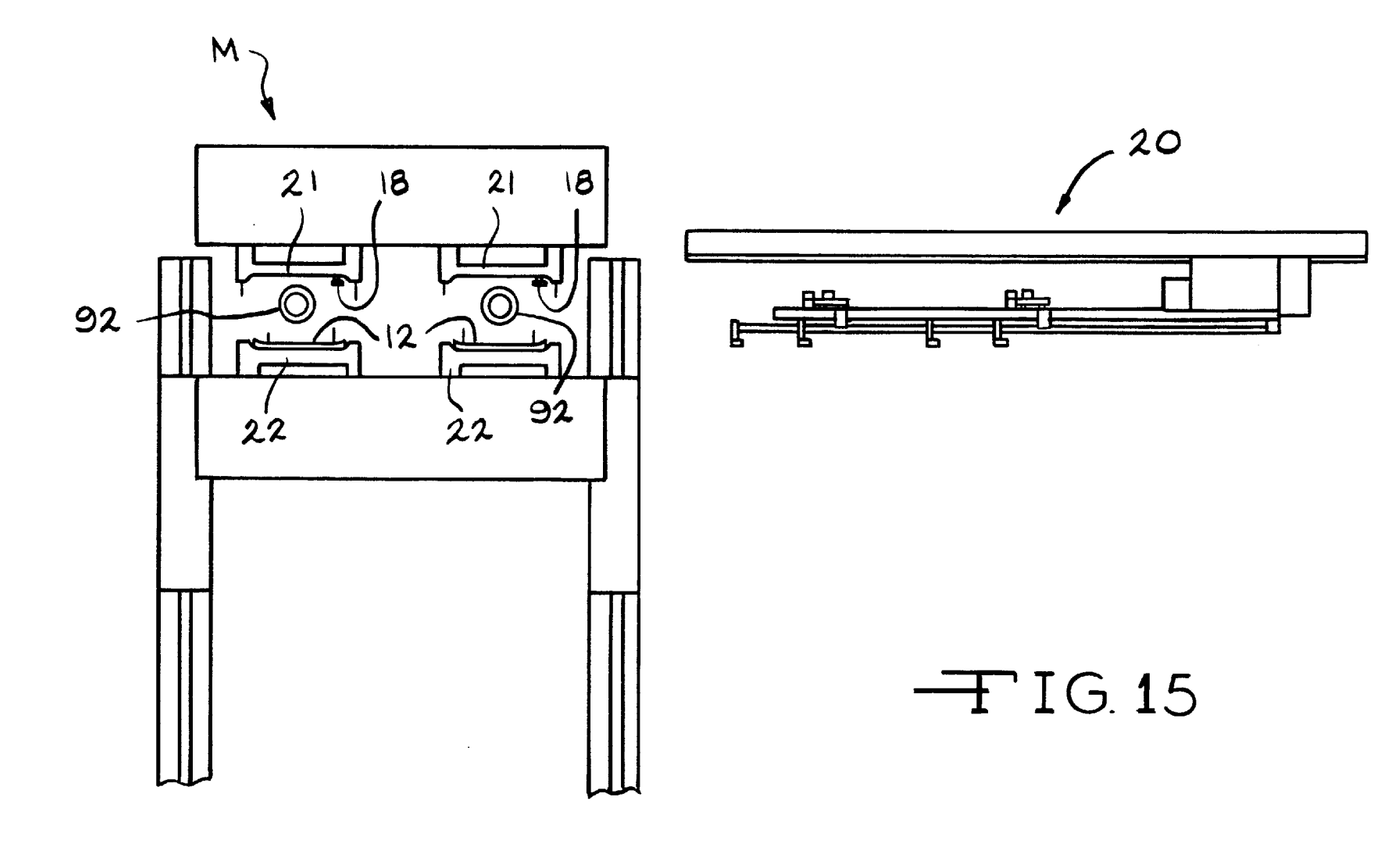
Figure 16:
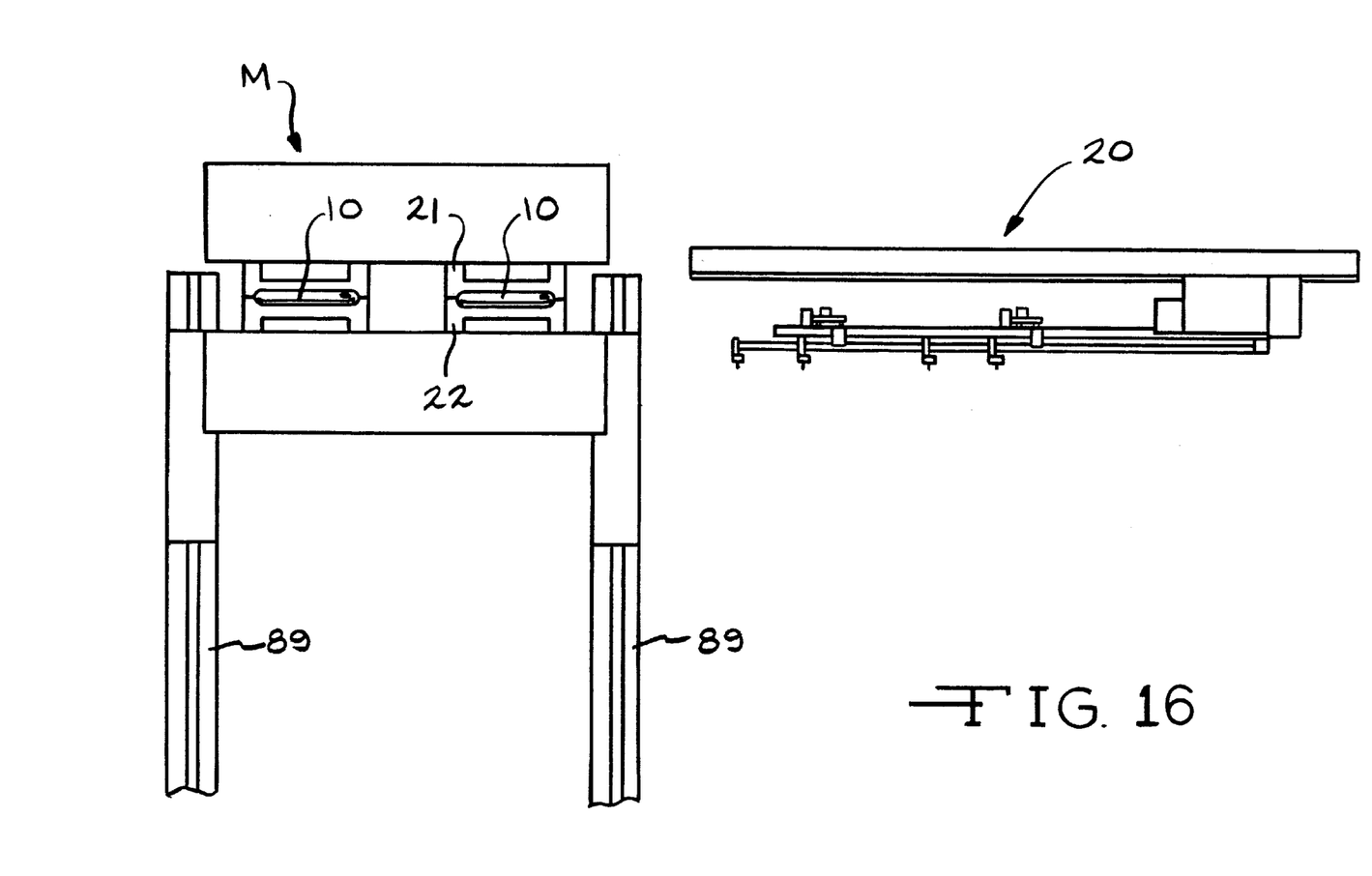

Referring to FIGS. 12 through 16, there is shown schematically a blow mold machine M having two sets of molds each having a fixed mold section 21 and a moveable mold section 22 mounted on rails. In FIG. 12 the mold sections 21, 22 are spaced apart and the insertion device 20 including the carpet inserter 30 and nut inserter 50 are outside of the mold sections 21, 22 in a position remote from the blow molding machine M. FIG. 13 shows the carpet inserter 30 carry carpets 12 and the nut inserter 50 carrying nuts (not shown) moved to a position between the open sections 21, 22. Thereafter, as shown in FIG. 14, the carpet inserter 30 is actuated to move the pin support 33 and pins 31 with the carpet 12 thereon toward the moveable mold sections 22 so that the pins 31 supporting the carpet are moved to a position overlying the retention pins 24 extending from the mold mating face 27 as shown in FIG. 7. When in such position, the cylinder 37 is then actuated to move the stripper plate 36 toward the mold mating face 27. Such movement of the stripper plate 36 will initially cause the retention pin 24 extending outwardly from the mold mating face 27 to extend through the lower portion of the slit 25 of the carpet 12 and then into the lower portion of the slot 38 of the stripper plate 36. Continued movement of the stripper plate 36 strips the carpet 12 off of the pin 31 and onto the retention pin 24. The force of gravity will cause the carpet to drop to a position at which the end of the slit 25 is engaged to the retention pin 24. The cylinder 37 is then actuated to retract its piston rod and the stripper plate 36 carried thereby.

The nut inserter 50, aligned with the respective pins 52 of the stationary mold section 21 is in position for movement first of the bushing 78 into engagement with the alignment pin 55 and subsequently of the nest assemblies 62 to transfer the nuts 18 to the pins 52.

Following transfer of the carpets 12 to their respective mold sections 22 and transfer of the nuts 18 to their respective mold sections 21, and withdrawal of the insertion device 20 from between the open mold sections 21, 22, tubular parisons 92 of heated thermoplastic material are extruded or otherwise positioned between the open mold sections 21, 22, the movable mold sections 22 are caused to close against the fixed mold sections 21 pinching the tubular parisons in the cavity defined by the recesses 28 and 29 at which point pressurized air or other fluid is directed into the mold enclosed parisons 92 to cause them to be expanded therein forming the molded panel 10 with the carpet 12 adhered to one side and the nuts 18 retained on the other side with flash 16 outwardly of the molded panel.

Many modifications will become readily apparent to those skilled in the art. Accordingly, the scope of the present invention should be determined only by the scope of the claims.

I claim:

1. A method for positioning an element between the open sections of a mold preparatory to molding an article with said element affixed thereto, said mold sections having a parting surface, one of said open sections having at least one pin extending toward the opposing section,
    (a) providing an insert arm movable from a position outwardly of said open sections to a position between said open sections, said insert arm having at least one pin extending therefrom and a stripper plate movable relative to said insert arm pin;
    (b) providing an opening in said element;
    (c) positioning said element on said insert arm with said insert arm pin extending through said opening and said stripper plate positioned on the opposite side of said element from said mold section pin;
    (d) moving said insert arm with said element from said outward position to a position at which said insert arm pin is vertically aligned with and above said mold section pin; and
    (e) moving said stripper plate and said element toward said mold section to
        (i) cause said mold section pin to extend through said opening,
        (ii) cause said element to be removed from said insert arm pin, and
        (iii) cause said element to drop to and be supported on said mold section pin.

2. The method according to claim 1 wherein said mold section has a second pin extending therefrom and further including the steps of providing a second insert arm pin spaced apart from said first insert arm pin a distance such that during step (d) said second insert arm pin overlies and is aligned with said mold section second pin.

3. A method for positioning a metallic fastener between the open sections of a mold preparatory to molding an article with said metallic fastener affixed thereto, said mold sections each having a parting surface and at least one of said mold sections having a recess comprising the steps of
    (a) providing on said one mold section a first magnet in said recess in the area intended to receive said fastener;
    (b) providing an insert arm movable from a position outwardly of said mold sections to a position between said mold sections said insert arm having (i) a nest supporting one of said fasteners in a fixed position and (ii) a second magnet for steadying said fastener in said nest, said second magnet being less powerful than said first magnet;
    (c) positioning a fastener in said nest while said insert arm is in said outward position;
    (d) moving said insert arm from said outwardly position to said position between said mold sections; and
    (e) moving said nest toward said recess to a position at which said first magnet draws said fastener out of said nest and into said recess.

4. The method according to claim 3 further including the steps of providing a support pin extending outwardly from said recess in the area of said first magnet and positioning said fastener over said support pin during step (e).

5. The method according to claim 4 wherein one of said mold sections has a guide pin and said insert arm has a cavity to receive said guide pin and further including the step of moving said guide pin into said cavity prior to or during step (e).

6. The method according to claim 3 further including the step of rotating said nest from a position facing outwardly when outwardly of said mold sections to a position facing said recess when between said mold sections.

7. The method according to claim 3 further including the steps providing a guide mechanism on said insert arm and moving said guide mechanism between a pair of guide rollers when said insert arm moves to a position between said mold sections.

8. The method according to claim 3 further including the steps of
 (a) providing (i) a pin on the parting surface of the other of said mold sections and (ii) a positioning arm mounted on said insert arm, said positioning arm having a pin extending therefrom;
 (b) placing an element on said positioning arm pin, said element having an opening through which said positioning arm pin extends;
 (c) moving said positioning arm with said element supported on said positioning arm pin between said mold sections to a position at which said opening is aligned with said mold section pin; and
 (d) stripping said element from said positioning arm pin and onto said parting surface pin.

9. A method for molding a plastic article with a metallic fastener affixed thereto comprising the steps of
 (a) providing a mold having first and second partible sections with recesses and parting surfaces, said mold sections movable between an open spaced apart position to a closed position wherein said mold sections cooperate to define a molding cavity;
 (b) providing a first magnet in the recess of said first mold section;
 (c) providing an insert arm movable from a position outwardly of said mold sections to a position between said mold sections said insert arm having (i) a nest supporting one of said fasteners in a fixed position thereon and (ii) a second magnet for steadying said fastener in said nest, said second magnet being less powerful than said first magnet;
 (d) positioning a fastener in said nest;
 (e) moving said insert arm and said nest toward said recess to a position at which said first magnet draws said fastener out of said nest and into said recess;
 (f) moving said insert arm to said outwardly position;
 (g) closing said first and second partible sections; and
 (h) forcing plastic material into conformity with said cavity and around at least a portion of said metallic fastener to form said plastic article with said metallic fastener affixed thereto.

10. The method of molding according to claim 9 further including the steps of providing a support pin extending outwardly from said recess in the area of said first magnet and positioning said fastener over said support pin during step (e).

11. The method according to claim 10 wherein one of said mold sections has a guide pin and said insert arm has a cavity to receive said guide pin and further including the step of moving said guide pin into said cavity prior to or during step (e).

12. The method according to claim 9 further including the step of rotating said nest from a position facing outwardly when outwardly of said mold sections to a position facing said recess when between said mold sections.

13. The method according to claim 9 further including the steps providing a guide mechanism on said insert arm and moving said guide mechanism between a pair of guide rollers when said insert arm moves to a position between said mold sections.

14. The method according to claim 9 further including the steps of
 (a) providing (i) a pin on the parting surface of the other of said mold sections and (ii) a positioning arm mounted on said insert arm, said positioning arm having a pin extending therefrom;
 (b) placing an element on said positioning arm pin, said element having an opening through which said positioning arm pin extends;
 (c) moving said positioning arm with said element supported on said positioning arm pin between said mold sections to a position at which said opening is aligned with said mold section pin; and
 (d) stripping said element from said positioning arm pin and onto said parting surface pin.

15. A method for molding a plastic article with an element affixed thereto comprising the steps of:
 (a) providing a mold having first and second partible sections with recesses and parting surfaces, said partible sections movable between an open spaced apart position to a closed position wherein said partible sections cooperate to define a molding cavity, said first partible section having at least one pin extending outwardly toward said second partible section;
 (b) providing an insert arm having a pin extending therefrom and a stripper plate movable relative to said insert arm pin, said insert arm movable from a position outwardly of said first and second partible sections to a position between said first and second partible sections;
 (c) positioning an element having an opening on said insert arm with said insert arm pin extending through said opening;
 (d) moving said insert arm with said element to a position at which said opening is aligned with said first partible section pin;
 (e) moving said stripper plate and said element toward said first partible section to (i) cause said first partible section pin to extend through said opening below said insert arm pin and (ii) cause said element to be stripped from said insert arm pin and supported on said first partible section pin;
 (f) moving said insert arm to said outwardly position;
 (g) closing said first and second partible sections with said element therebetween; and
 (h) forcing plastic material into conformity with said cavity to adhere said element to said plastic.

16. The method according to claim 15 wherein said first partible section has a second spaced apart pin extending therefrom and further including the steps of providing a second insert arm pin spaced apart from said first insert arm pin a distance such that during step (d) said second insert arm pin overlies and is aligned with said mold section second spaced apart pin.

* * * * *